United States Patent [19]

Schwarz et al.

[11] Patent Number: 4,810,463
[45] Date of Patent: Mar. 7, 1989

[54] PROCESS FOR FORMING SINTERED CERAMIC ARTICLES

[75] Inventors: James A. Schwarz, Fayetteville; Yao-Jyh R. Huang, Syracuse, both of N.Y.

[73] Assignee: Syracuse University, Syracuse, N.Y.

[21] Appl. No.: 906,792

[22] Filed: Sep. 12, 1986

[51] Int. Cl.[4] ............................................. C04B 35/64
[52] U.S. Cl. ........................................ 419/10; 264/63; 419/19
[58] Field of Search .................. 264/63; 419/5, 10, 19

[56] References Cited

U.S. PATENT DOCUMENTS

| | | | |
|---|---|---|---|
| 3,074,143 | 1/1963 | Smith | 264/61 |
| 3,520,054 | 7/1970 | Pensack et al. | 264/63 |
| 3,808,041 | 4/1974 | Rosenberger | 427/89 |
| 3,907,710 | 9/1975 | Lundsager | 423/213.5 |
| 4,040,823 | 8/1977 | Yamaguchi | 264/63 |
| 4,080,414 | 3/1978 | Anderson et al. | 264/63 |
| 4,193,793 | 3/1980 | Cheung | 75/235 |
| 4,474,731 | 10/1984 | Brownlow et al. | 264/63 |
| 4,627,160 | 12/1986 | Herron et al. | 264/61 |
| 4,649,125 | 3/1987 | Takeuchi et al. | 264/61 |

Primary Examiner—James Derrington
Attorney, Agent, or Firm—Wall and Roehrig

[57] ABSTRACT

Ceramic materials in the form of powdered $\gamma$-$Al_2O_3$ are surface modified by addition of the salts or oxides of nickel or tungsten prior to contact of the ceramic with polymer binder suspensions. The sintering and densification of said ceramic materials produces ceramic bodies substantially free from carbonaceous residues.

4 Claims, 1 Drawing Sheet

PROCESS FOR FORMING SINTERED CERAMIC ARTICLES

BACKGROUND OF THE INVENTION

This invention relates to the sintering of ceramic articles from a mixture of a ceramic powder with a suitable hydrocarbon binder, and is more particularly directed to a process of forming, sintering, and densifying of such articles so that they are substantially free of carbon residues.

Ceramic articles for use in electronic devices are often fabricated by mixing ceramic powder with a suitable binder, e.g. a polymeric hydrocarbon binder, molding the mixture to the desired shape, and then firing the molded article to sinter and densify the ceramic and at the same time to drive off the polymeric binder.

In the electronics industry, the structures produced by these procedures usually have conductive metallic pathways formed in them. A mixture of an alumina ceramic powder and polymeric binder powder may be combined with a pattern of a mixture of conductive powdered metal and binder, so that the ceramic substantially surrounds or encapsulates the powdered metal pattern. Because the metallization must not be oxidized, it is necessary to sinter the articles in atmospheres low in oxygen. Thus, atmospheres of gaseous hydrogen and steam are preferably employed. Attention has focused on eliminating the carbon residues that may remain from sintering in this fashion.

The conventional process for molding composites of powdered ceramics to produce sintered, dense composite articles involves a first pre-sintering heating stage to drive off any residues of the hydrocarbon polymer used to assist in molding the ceramic and metal powders. Where a low oxygen atmosphere must be employed, the carbon does not oxidize, and so incomplete removal of carbonaceous materials from the binder component is often experienced. Thereafter, when the sintering and densification heating cycle is completed, instead of a white ceramic, a black ceramic is obtained. The carbon remaining in the ceramic can impede reliable densification as well as form conduction paths which lead to lower insulation resistance and can increase dielectric losses.

The manufacture of electronic devices using ceramic powder to form an insul-ating matrix is discussed in U.S. Pat Nos. 3,808,041, 3,074,143, 3,520,054 and 4,080,414.

A recent improvement is described in Brownlow and Plaskett U.S. Pat. No. 4,474,731. That process is intended to achieve substantially complete removal of the binder and carbonaceous residue of the binder. For this purpose, a pyrolytic catalyst is included with the binder and ceramic. The pre-sintering heating step is followed by heating the ceramic and binder in a low oxygen atmosphere at a temperature in the range of 350–780 degrees celsius in the presence of the catalyst, e.g. nickel, platinum, and/or palladium ions, for a time sufficient to catalytically pyrolyze and drive off the carbon residues on the ceramic. In the Brownlow and Plaskett process, the Ni, Pt, and Pd ions are added in compound form to the polymer binder by solution prior to preparation of the ceramic powder mixtures, so there is not optimum distribution of the catalyst onto the surface of the ceramic powder particles.

A major problem is encountered in the Brownlow and Plaskett process. That is, for catalytic metals that function as heterogeneous catalysts, the catalytic metal ions should be firmly anchored on the ceramic support particles. However, the binder/metal-ion slurry used in the Brownlow and Plaskett process being chemically complex does not always place the catalyst ions on the support sites. Where the ceramic, as for example, powdered $\gamma$-Al$_2$O$_3$, is mixed into the binder/metal-ion slurry, and the metal-ions must be deposited onto the ceramic to perform their catalytic function during the pre-sintering, the deposition of catalyst onto the ceramic support will not occur in a predictable or reproducible manner. Consequently, the pyrolysis of carbon residues may not be complete. For example, the dilute catalyst metal concentration (typically 1.5% by weight of metal oxide based upon the dry weight of the polymer binder) will be "swamped" by the polymer which, itself, will be strongly adsorbed onto the ceramic particles. This leads to a nonuniform distribution of metal ions throughout the composite.

OBJECTS AND SUMMARY OF THE INVENTION

Accordingly, it is an object of this invention to produce sintered ceramic articles which are substantially free of carbonaceous residue, and in which the process of carbon removal in the sintering process is consistent, repeatable, and predictable.

It is a more particular object of this invention to produce such sintered ceramic articles employing a heterogeneous catalyst in an optimal, efficient manner so that the sintered ceramic articles are dense and substantially free of carbonaceous residues.

According to an aspect of this invention a substantial improvement is achieved over the current or conventional ceramic process, by supporting a pyrolytic catalyst on the ceramic support prior to contact with the polymer binder. This optimally disperses the catalyst as small crystallites (optimally, 10A to 30A) on the surfaces of the ceramic particles, modifying the surface characteristic of the ceramic. Preferably, the ceramic material is powdered $\gamma$-Al$_2$O$_3$ or a mixture of $\gamma$-Al$_2$O$_3$ and SiO$_2$, and the pyrolytic catalyst is Ni or WO$_3$, applied in any of several known fashions onto the ceramic, e.g., by metal salt deposition. The Ni and WO$_3$ catalysts are heterogeneous catalysts; that is, the metal ions cooperate with the alumina ceramic support material to reform the carbon into a volatile hydrocarbon such as CH$_4$, C$_2$H$_6$, etc. On the other hand, the metal catalyst particles, if dispersed in the hydrocarbon polymer and out of contact with the alumina, have little if any catalytic effect.

The ceramic articles produced according to this invention are useful as substrates for microcircuit electronic components, where metalized strips and surfaces are formed within the ceramic article.

In addition, these articles have many applications outside electronics. For example, many industrial ceramic catalysts, such as Al$_2$O$_3$, SiO$_2$—Al$_2$O$_3$, and zeolites used to process petroleum feeds often suffer deactivation due to a number of factors, a major one of which is the deposition of carbonaceous residues. These residues are derived from the reactants or their intermediates. Solid ceramic catalysts which have particles of a suitable heterogeneous pyrolytic catalyst distributed over them would avoid this problem.

Ceramic materials employing heterogeneous catalysis and applying the teachings and principles of this invention produce reliable, consistent ceramic materials for use in electronic devices or in other devices formed of densified sintered ceramic material.

The above and many other objects, features, and advantages of this invention will be more fully understood from the following description of a preferred embodiment of the process of this invention, which should be read in conjunction with the accompanying drawing.

DETAILED DESCRIPTION OF THE PREFERRED EMBODIMENT

Figure 1:
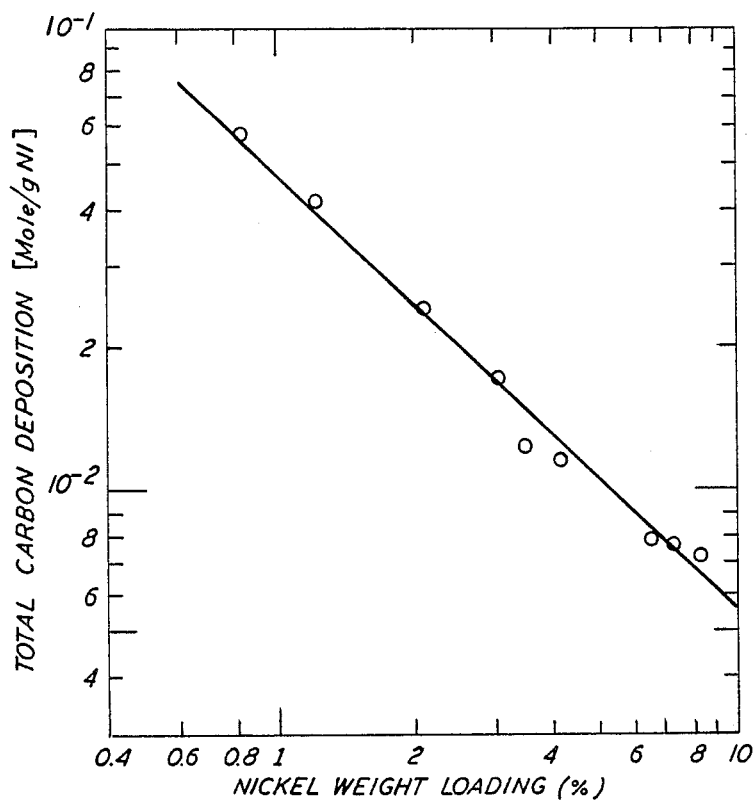
FIG. 1 is a chart of total carbon deposition versus weight loading of a metal catalyst.

The preparation of supported metal catalysts is a complex, delicate operation, and this has made catalytic design of high quality sintered ceramic articles an inexact art. High activity, selectivity, and longevity of supported metal catalysts are each directly related to the chain of steps of catalyst preparation. Many, if not all, of the critical variables which determine catalyst performance must be uniformly and repeatably controlled. Metal salt deposition, drying, calcination, reduction time, temperature, atmospheric composition, and flow rate are all important factors that affect the production and reproducibility of a viable catalyst. However, the inability to control the steps in such a causal chain has, to a large extent, thwarted the development of a scientific basis for catalyst design.

Recently, however, it has been discovered that nickel concentration, ionic strength, and pH of impregnation solutions used to form Ni/$\gamma$-Al$_2$O$_3$ catalysts all affect the amount of catalytic precursors adsorbed on the support during wet impregnation. The weight loading of the catalytic precursors has been found to be based solely on those solution variables. It has also been recently discovered that the structure, dispersion, activity, selectivity, and poison resistance of the finished catalysts activated from these catalytic precursors were correlated to the weight loading of the catalysts. With this knowledge, it is now possible to predict the performance of catalysts based on the preparation variables during wet impregnation and thus, it is also possible to provide a scientific basis for producing and reproducing active Ni/Al$_2$O$_3$ cataylsts.

Weight Loading

The concentration of catalytic precursors on a support can be predicted by considering the contributions of "adsorption" and of "pore filling".

$$\text{Total wt \% Ni} = (x+y)/(w+x+y) \quad (1)$$

where $$x = [(C_{Ni})_o - (C_{Ni})_f] \cdot V_{sol} \cdot M_{Ni} \quad (1a)$$

$$y = (C_{Ni})_f \cdot V_{pore} \cdot M_{Ni} \quad (1b)$$

In Equation (1), $(C_{Ni})_o$ and $(C_{Ni})_f$ are the initial and final concentrations of nickel in solution (moles/liter), $V_{sol}$ (liters) is the volume of the impregnating solution, $V_{pore}$ (liters) is the pore volume of the Al$_2$O$_3$, sample, $M_{Ni}$ is the molecular weight of nickel, and w is the weight of the Al$_2$O$_3$ (grams). The contributions x and y are due to "adsorption" and "pore filling", respectively. Furthermore, the adsorption component x can be written as follows:

$$\begin{aligned} x &= [(C_{Ni})_o - (C_{Ni})_f] V_{sol} \\ &= (C_{Ni})_o \{a + b[H^+] 10^c [I]/(1 + [I])\} \end{aligned} \quad (2)$$

where [H] and [I] are the hydrogen ion concentration and ionic strength of the impregnant, respectively. The values of the constants are $a = 0.48 \times 10^{-3}$ l, $b = 0.32 \times 10^{-2}$ l$^2$/mol, and $c = -0.46$. The combination of Equations 1 and 2 permits prediction of weight loading of the nickel catalytic precursors based solely on the impregnation solution variables. These equations further explain the interface between impregnation solution variables and catalytic properties of the finished catalyst. Therefore, the catalytic properties can be predicted directly from the solution variables. The predicted and experimentally determined values of carbon deposition subsequent to steady-state reaction are presented as follows:

Carbon Deposition

The amount of carbon-containing residues left on the metal or support surface after steady-state CO hydrogenation has been studied, and FIG. 1 shows the plot of total carbon deposition vs nickel weight loading. The functionality describing the relationship between total carbon deposition and weight loading is given as follows:

$$[\text{Total Carbon Deposition}] = \quad (3)$$

$$0.04962 \times [\text{Nickel Weight Loading (\%)}] \text{ Mole/g catalyst}$$

Figure 2:
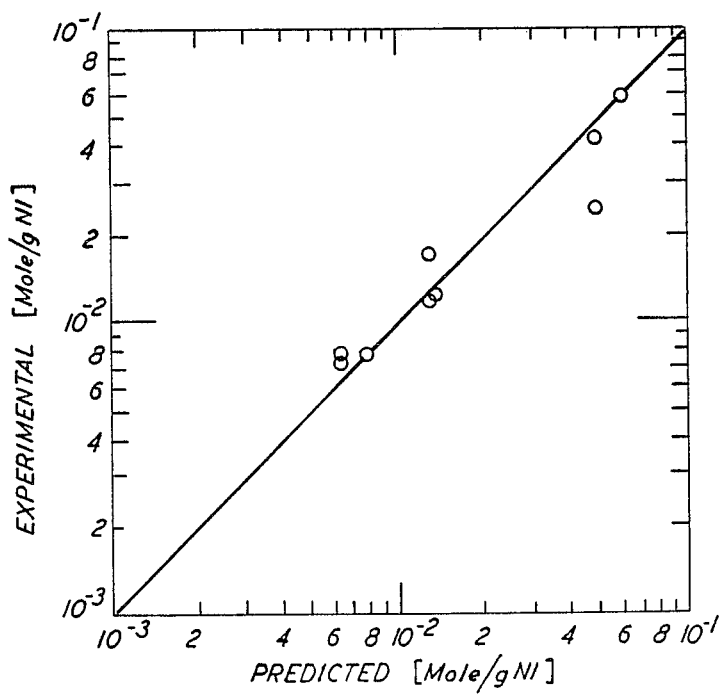
FIG. 2 is a chart comparing experimental results of ceramic article preparation with predicted total carbon deposition for one preferred embodiment of this invention.

FIG. 2 compares experimental and predicted carbon deposition. As is evident, the agreement is excellent.

With the ceramic sintering and densification technique hereof, the poison resistance of Ni/Al$_2$O$_3$ catalysts can be reasonably predicted based solely on the solution variables during wet impregnation. These findings allow one to produce and reproduce viable Ni/Al$_2$O$_3$ catalysts by wet impregnation.

In a preferred mode for sintering and densification of ceramic powders, Butvar aqueous dispersion BR, and Butvar 98/Benzoflex using a solvent composed of 75% methyl isobutyl ketone (MIBIC) and 25% methanol (MeOH) are employed as a binder: The Butvar aqueous dispersion BR is an aqueous suspension of a terpolymer of polyvinyl butyral/polyvinyl alcohol/polyvinyl acetate with added soaps. The aqueous phase is driven off (i.e., by heating at 100 degrees celsius) and subsequently the polymer/ceramic (surface modified $\gamma$-Al$_2$O$_3$) is subjected to presintering and sintering steps.

The ceramic materials employed in this embodiment are surface modified forms of $\gamma$-Al$_2$O$_3$. Surface modification is accomplished by standard procedures of catalyst preparation, the surface modifying agents including tunsten oxide (WO$_3$).

The presintering decarburization is carried out in an atmosphere of hydrogen or hydrogen/steam at elevated temperatures and pressures. Inert diluents (He, Ar, CO$_2$, etc. can also be employed.

Several species of carbon residue have been detected on $\gamma$-Al$_2$O$_3$ ceramic substrates. These include a graphite phase that is extremely stable and an amorphous phase that is highly reactive. The deposition of metal catalysts, in a controlled fashion, onto the $\gamma$-$Al_2O_3$ particles promotes the formation of the amorphous phase and eliminates the less reactive forms. The reactive amorphous carbon is quickly reacted and volatized in the presence of $H_2$ and heat.

Articles produced according to the above process are consistently white in color, indicating an extremely low carbon presence. Where the articles are ceramic microcircuit supports containing embedded metallized conductors, the supports are consistently free from stray conduction paths, have low loss factors and high Q. Because the nickel or other metal-ions are distributed uniformly and optimally, a minimal amount only of the metallic salt or oxide is required to treat the initial ceramic, and the minimal amount of metal remaining after sintering does not affect the electrical qualities of the ceramic support.

While the present invention has been described in detail with reference to a specific preferred embodiment, it should be recognized that many modifications and variations thereof would present themselves to those of skill in the art without departing from the scope and spirit of this invention, as defined in the appended claims.

What is claimed is:

1. Process for sintering and densification of ceramic materials containing a hydrocarbon pre-sintering binder which produces a sintered, dense ceramic product substantially free of carbonaceous residues, the process comprising the steps of:

impregnating an unsintered mass of ceramic particles as a starting material, prior to contact thereof with said hydrocarbon binder, with a metal salt solution to produce a metallic heterogeneous catalyst in which metal ions are firmly anchored at surface sites of said ceramic particles;

combining the so-impregnated ceramic particles with said hydrocarbon binder; and compacting the combined ceramic particles and binder, said compacting including heating said ceramic particles in a relatively oxygen-free atmosphere to volatize said hydrocarbon binder and to sinter said ceramic particles to produce said ceramic product substantially free of said carbonaceous residue.

2. The process of claim 1 wherein said metal salt is a nickel salt.

3. Process for sintering and densification of ceramic materials containing a hydrocarbon pre-sintering binder which produces a sintered, dense ceramic product subtantially free of carbonaceous residues, the process comprising the steps of impregnating an unsintered mass of ceramic particles as a starting material, prior to contact thereof with said hydrocarbon binder, with a metal oxide solution to produce a metallic heterogeneous catalyst in which the metal oxide is firmly anchored at surface sites of said ceramic particles;

combining the so-impregnated ceramic particles with said hydrocarbon binder; and compacting the combined ceramic particles and binder, said compacting including heating said ceramic particles and binder, said compacting including heating said ceramic particles in a relatively oxygen free atmosphere to volatize said hydrocarbon binder and to sinter said ceramic particles to produce said ceramic product substantially free of said carbonaceous residue.

4. The process of claim 3 wherein said metal oxide is tungsten oxide.

* * * * *